United States Patent [19]

Bühler et al.

[11] Patent Number: 4,937,325
[45] Date of Patent: Jun. 26, 1990

[54] PROCESS FOR DYEING AND PRINTING SYNTHETIC FIBERS WITH MIXTURES OF MONOAZO DYESTUFFS

[75] Inventors: Ulrich Bühler, Schöneck; Klaus Hofmann, Frankfurt, both of Fed. Rep. of Germany; Hiroshi Mitsuhashi; Harutsugu Ushiota; Akiharu Odagiri; Gen Kano; Susumu Sakamoto, all of Kanagawa, Japan

[73] Assignees: Cassella Aktiengesellschaft, Frankfurt am Main, Fed. Rep. of Germany; Tokico Ltd., Kanagawa, Japan

[21] Appl. No.: 282,740

[22] Filed: Dec. 12, 1988

Related U.S. Application Data

[60] Division of Ser. No. 159,482, Feb. 16, 1988, abandoned, which is a continuation of Ser. No. 901,992, Aug. 27, 1986, abandoned, which is a continuation of Ser. No. 724,600, Apr. 18, 1985, abandoned; which is a continuation of Ser. No. 528,405, Sep. 1, 1983, abandoned.

[30] Foreign Application Priority Data

Sep. 15, 1982 [DE] Fed. Rep. of Germany ....... 3234186

[51] Int. Cl.$^5$ ............... C09B 67/22; C09B 67/40; C09B 67/48; D06P 3/87
[52] U.S. Cl. ........................... 534/573; 8/639; 8/696; 534/575; 534/597; 534/850; 534/887
[58] Field of Search ............... 535/573 M, 850; 8/639, 8/696; 92/5 R

[56] References Cited

U.S. PATENT DOCUMENTS 2,786,989  3/1957  Smith ..................... 340/679
2,946,203  7/1960  Carver .
3,954,395  5/1976  Leverenz ................. 534/573 X
3,955,919  4/1983  Fujii et al. .............. 534/573 X
4,381,262  4/1983  Buhler et al. ............ 534/573 X
4,430,090  2/1984  Buhler et al. ............ 534/573 X

FOREIGN PATENT DOCUMENTS 0036512  9/1981  European Pat. Off. ......... 534/573
0093935  11/1983  European Pat. Off. ......... 534/573
2193062  2/1974  France ..................... 534/573

OTHER PUBLICATIONS

Industriekurier No. 149, Apr. 27, 1967, p. 614.

Primary Examiner—Floyd D. Higel
Attorney, Agent, or Firm—Connolly and Hutz; Wenderoth, Lind & Ponack

[57] ABSTRACT

A monoazo dyestuff composition comprising at least two different individual compounds of the formula

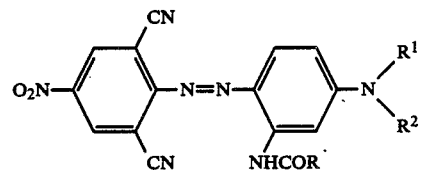

wherein $R^1$ and $R^2$, independently of each other, are linear or branched alkyl having 1 to 4 carbon atoms and R is linear or branched alkyl having 1 to 5 carbon atoms, and where said individual compounds differ from each other in at least the R moiety. The monoazo dyestuff mixtures are used for the dyeing and printing of hydrophobic fibers such as high molecular weight polyesters of their mixtures with natural fiber material.

3 Claims, No Drawings

PROCESS FOR DYEING AND PRINTING SYNTHETIC FIBERS WITH MIXTURES OF MONOAZO DYESTUFFS

This is a division of application Ser. No. 159,482 filed Feb. 16, 1988, now abandoned, which in turn is a continuation of application Ser. No. 901,992 filed Aug. 27, 1986, now abandoned, which in turn is a continuation of application Ser. No. 724,600 filed Apr. 18, 1985, abandoned, which in turn is a continuation of Ser. No. 528,405, filed Sept. 1, 1983, abandoned.

The invention relates to monoazo dyestuff mixtures which are characterised in that they consist of two or more different dyestuffs of the formula I

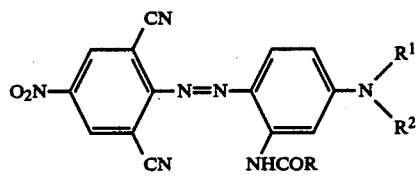

wherein $R^1$ and $R^2$, independently of each other, denote linear or branched alkyl having 1 to 4 C atoms and R denotes linear or branched alkyl having 1 to 5 C atoms, and where the dyestuffs differ from each other at least in the R radicals.

The invention also relates to processes for preparing the dyestuff mixtures of the invention and to their use in dyeing and printing hydrophobic fibre materials.

It is already known that mixtures of at least two different individual dyestuffs of the formula I have better dyeing properties than the individual dyestuffs. However, significant mixture effects are only obtained when the dyestuffs do not differ in respect of the R radical and when the R radical denotes acetyl (cf. German Auslegeschrift 2,234,465, column 4, lines 30 to 39; corresponding to U.S. Pat. No. 3,954,395).

It has now been found, surprisingly, that the mixtures of the invention have significantly improved dyeing properties compared with the individual dyestuffs and, in some instances, even compared with the mixtures of German Auslegeschrift 2,234,465.

The dyestuff mixtures of the invention consist of two or more different, for example 2, 3 or 4 different, dyestuffs of the formula I. Preferred dyestuff mixtures of the invention consist of 2 different dyestuffs of the formula I.

Other preferred dyestuff mixtures consist of dyestuffs of the formula I in which $R^1$ and $R^2$ denote linear alkyl having 2 to 4 C atoms or R denotes linear or branched alkyl having 1 to 3 C atoms. In particularly preferred dyestuff mixtures, the individual dyestuffs satisfy both the abovementioned conditions, i.e. $R^1$ and $R^2$ denote linear alkyl having 2 to 4 C atoms and R denotes linear or branched alkyl having 1 to 3 C atoms. Further preferred dyestuff mixtures consist of dyestuffs of the formula I in which $R^1$ and $R^2$ are identical and, in particular, denote ethyl or non-propyl. Very particularly preferred dyestuff mixtures consist of two different dyestuffs of the formula I in which $R^1$ and $R^2$ denote ethyl. In these mixtures, R is very particularly preferred to be a methyl/n-propyl, ethyl/n-propyl, or n-propyl/i-propyl combination.

Other particularly preferred dyestuff mixtures have been heated in the course of their preparation to temperatures of at least 80° C., or consist of mixed crystals formed from two or more dyestuffs of the formula I.

In the dyestuff mixtures of the invention the ratio of the various dyestuffs of the general formula I can vary within relatively wide limits. In general, the minimum proportion by weight of one component is 10%, and the maximum proportion by weight is 90%. Dyestuff mixtures which consist of only two dyestuffs of the general formula I preferably have a ratio of 70:30 to 30:70, i.e. the proportion by weight of one dyestuff ranges from 30 to 70%.

The dyestuff mixtures of the invention can be prepared by various methods; for one by mixing at least two individual dyestuffs of the formula I—preferably in the presence of dispersants. This mixing process takes place at temperatures of 0° to 190° C., preferably in suitable mills, for example ball mills and sand mills, as well as kneaders, but it can also be effected through mixing by hand or by stirring the dyestuffs into dispersing media or dyeing liquors.

The dispersants can be anionic or nonionic. Anionic dispersants are for example condensation products of naphthalene, formaldehyde and sulphuric acid and ligninsulphonates. Examples of nonionic dispersants are described in German Offenlegungsschrift 2,757,330 (corresponding to U.S. Pat. No. 4,225,311). The individual dyestuffs of the formula I are known and have been described, for example in German Patent 1,794,402 (corresponding to U.S. Pat. No. 3,962,209) and in German Offenlegungschrift 3,009,695 (based on JA 79/32067, corresponding to U.S. Pat. No. 4,266,064).

A further process for preparing the dyestuff mixtures of the invention is characterised in that an amine of the formula II

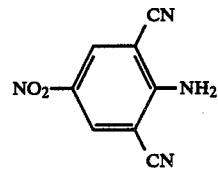

is diazotised and coupled onto a mixture of at least two different coupling components of the formula III

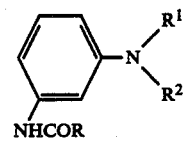

in which $R^1$, $R^2$ and R have the abovementioned meanings. The composition of the mixture of these coupling components is chosen to be such that dyestuff mixtures of the invention form. In this process the diazotisation and coupling are carried out in a manner known per se, namely as customary for preparing individual dyestuffs and as described, for example, in Czech Patent 164,657.

In another, preferred process, the new dyestuff mixtures can be prepared by replacing the halogen in dyestuff mixtures which consist of at least two dyestuffs of the formula IV

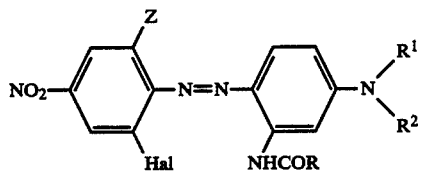

(IV)

in which Z represents cyano or halogen, Hal represents halogen, preferably bromine, and $R^1$, $R^2$ and R have the abovementioned meanings, in a manner known per se by cyano, for example as described in British Patent 1,125,685 for single dyestuffs. The composition of the mixture of the dyestuffs of the formula IV is chosen to be such that dyestuff mixtures of the invention form.

Dyestuff mixtures which in the course of their preparation have been heated to temperatures of at least 80° C., for example to temperatures of 80° to 190° C., in particular 90° to 150° C., preferably to 100° to 140° C., can be prepared by heating the individual dyestuffs in the absence of a solvent or preferably in a dispersing medium, such as, for example, water, at said temperatures for 0.5 to 3 hours, after which they are cooled down, are isolated, as a rule, and are then mixed with each other. The heating may also be carried out in the course of recrystallising the individual dyestuffs. The heating in water at temperatures of greater than 100° C. is carried out in a sealed vessel. If the heating is carried out in a dispersing medium, it can be advisable to add one or more of the dispersants specified below.

Heating a dyestuff mixture which consists of two or more individual dyestuffs at the abovementioned temperatures produces, as a rule, mixed crystals which consist of two or more different dyestuffs of the formula I.

Novel dyestuff mixtures which consist of mixed crystals can also be obtained by dissolving a mixture of at least two of those separately prepared different dyestuffs of the formula I which have been described, for example, in German patent 1,794,402 or German Offenlegungsschrift 3,009,695, and causing the solution to produce crystals or a precipitate. Examples of solvents suitable for dissolving the dyestuff mixture are organic solvents, such as dimethylformamide, dimethyl sulphoxide, chlorobenzene, o-dichlorobenzene, toluene and the like. It is also possible to use mixtures of solvents. The dyestuff mixture is preferably dissolved at the boiling point of the solvent or solvent mixture. As the solution cools down, the mixed crystals crystallise out. The mixed crystals need not be formed through the solution cooling down, and can instead be made to precipitate by adding a solvent in which the dyestuff is less soluble.

Another, particularly preferred way of obtaining mixed crystals involves the abovementioned replacement of halogen by cyano in a mixture consisting of dyestuffs of the formula IV at temperatures of at least 80° C.

The mixed-crystal formation can preferably also be effected by warming a mixture of at least two separately prepared different dyestuffs of the formula I in a poor solvent or dispersing medium to dissolve the mixture only incompletely or negligibly and thereby converting it into mixed crystals. Water at temperatures of 80° to 190° C., in particular 90° to 150° C., preferably 100° to 140° C., was found to be a particularly suitable dissolving or, rather, dispersing medium for such a conversion of dyestuff mixtures into mixed crystals. It goes without saying that the heating at temperatures which can no longer be reached in an open vessel is carried out in an autoclave, and it is advisable to add one or more solubilisers. An example of such a solubiliser is a solvent which is completely soluble in water, namely a solvent such as, for example, ethanol, or an organic solvent, such as, for example, n-butanol, which is only partially soluble in water.

It is particularly preferred, however, to convert the dyestuff mixtures into mixed crystals by heating the mixtures in water to the abovementioned temperatures in the presence of one or more emulsifiers and/or dispersants.

Examples of suitable dispersants are anionic or nonionic dispersants, which can also be used together. Examples of anionic dispersants are condensation products of aromatic sulphonic acids and formaldehyde, in particular of alkylnaphthalenesulphonic acids and formaldehyde, condensation products of optionally substituted phenol with formaldehyde and sodium bisulphite, alkali metal salts of condensation products of optionally substituted phenol, naphthalenesulphonic or naphtholsulphonic acids, formaldehyde and sodium bisulphite, alkali metal salts of condensation products of optionally substituted phenolsulphonic acids, formaldehyde and urea, and alkali metal salts of ligninsulphonic acids; alkylsulphonates or alkylarylsulphonates, and alkylaryl polyglycol ether sulphates. Examples of nonionic dispersants or emulsifiers are reaction products of alkylene oxides, such as, ethylene oxide or propylene oxide, with alkylatable compounds, such as fatty alcohols, fatty amines, fatty acids, phenols, alkylphenols, arylalkylphenols, arylalkylarylphenols and carboxamides, such as, for example, products of the addition of 5 to 10 ethylene oxide units onto $C_8$–$C_{10}$-alkylphenols.

The conversion of the dyestuff mixtures into mixed crystals by heating in water is, as a rule, complete after 0.5 to 10 hours, preferably 1 to 3 hours.

The presence of mixed crystals can be demonstrated by X-ray counting tube diagrams.

The dyestuff mixtures of the invention, by themselves or mixed with other disperse dyestuffs, are highly suitable for dyeing and printing hydrophobic synthetic fibre materials. In particular when they have been heated in the course of their preparation to temperatures above 80° C. or when they are in the form of mixed crystals, they surprisingly are superior to the individual dyestuffs in respect of dyeing properties and colouristic fastness properties, such as levelling capacity, thermomigration, heat-setting fastness, fastness to water, washing and rubbing, in particular in build-up and affinity and thermal stability. Moreover, the dyestuff mixtures of the invention give superbly deep dyeings with excellent exhaustion of the dyebath even at decreased dyeing temperatures.

Examples of possible hydrophobic synthetic materials are cellulose-2½-acetate, cellulose triacetate, polyamides and, in particular, high molecular weight polyesters, such as polyethylene glycol terephthalate.

The dyestuff mixtures of the invention are preferably used for dyeing and printing materials made of high molecular weight polyesters, in particular those based on polyethylene glycol terephthalates, or their mixtures with natural fibre materials, or materials made of cellulose triacetate. These materials can be in the form of sheet- or thread-like structures, and have been processed into, for example, yarns or woven or knitted textile fabrics. Said fibre material is dyed with the dyestuff mixtures of the invention in a manner known per se, preferably out of an aqueous suspension, if desired in the presence of carriers, between 80° and about 110° C. by the exhaust method or by the HT method in a dyeing autoclave at 110° to 140° C., and by the thermofixing method, wherein the goods are padded with the dyeing liquor and are then fixed at about 180° to 230° C. The printing of said materials can be effected by printing the goods with print pastes containing dyestuff mixtures of the invention and then fixing the dyestuff by treating the goods thus printed, if desired in the presence of carriers, with superheated steam, saturated steam or dry heat at temperatures between 110° and 230° C. This produces very strong blue dyeings and prints having very good fastness properties, in particular a very good light fastness and a very good dry heat pleating and fixing fastness.

The dyestuff mixtures of the invention can also be used for dyeing the abovementioned hydrophobic materials from organic solvents, by the methods known for this purpose, and for spin-dyeing, melt-dyeing or mass-colouring.

The dyeing liquors and print pastes used in the above applications should contain the dyestuff mixtures of the invention in as fine a state of division as possible.

The dyestuffs are finely divided, in a manner known per se, by making a paste of the dyestuff mixtures, together with dispersants, in a liquid medium, preferably water, and subjecting the paste to the action of shear forces to comminute, by mechanical means, the original dyestuff particles until they have an optimum specific surface area and the amount of dyestuff that forms a sediment is very small. The dyestuff particles generally have a size between 0.5 and 5 μm, preferably about 1 μm.

The dispersants present in the milling process can be those nonionic or anionic dispersants already mentioned in the context of preparing mixed crystals by heating in water.

The dyestuff preparations thus obtained should be pourable for most application methods. The dyestuff and dispersant content is therefore limited in these cases. The dispersions are generally standardised to a dyestuff content of up to 30% by weight and a dispersant content of up to about 25%. For economic reasons the dyestuff content is usually not less than 15% by weight.

The dyestuff preparations can also contain further auxiliaries, for example auxiliaries which act as oxidising agents, such as, for example, sodium m-nitrobenzenesulphonate, or fungicides, such as, for example, sodium o-phenylphenolate or sodium pentachlorophenolate.

The dyestuff dispersions thus obtained can be very advantageously used for making up print pastes and dyeing liquors. They offer particular advantages, for example, in the case of the continuous methods, where dyestuff has to be fed continuously into the running apparatus to maintain the dyestuff concentration of the dyeing liquors at a constant value.

For certain uses it is preferable to have the dyestuffs formulated as powders. These powders then contain the dyestuff, dispersants and other auxiliaries, such as, for example, wetting, oxidising or dustproofing agents or preservatives.

A preferred method of preparing pulverulent dyestuff preparations consists in stripping the liquid dyestuff dispersions described above of their liquid, for example by vacuum-drying, freeze-drying, by drying on drum dryers, but preferably by spray-drying.

Dyeing liquors are prepared by diluting with the dyeing medium, preferably with water, the necessary amounts of dyestuff preparations prepared as specified above so as to produce for the dyeing a liquor ratio of 5:1 to 50:1.

The liquors are generally admixed with further dyeing auxiliaries, such as dispersants or wetting or fixing auxiliaries.

If the dyestuff is to be used for textile printing, the necessary amounts of the dyestuff formulations are kneaded together with thickeners, such as, for example, alkali metal alginates or the like, and, if desired, other additives, such as, for example, carriers, wetting agents or oxidising agents, to give print pastes.

The invention is illustrated in more detail by the following examples:

EXAMPLE 1

(a) 18.0 g of copper(I) cyanide are stirred together with 2.0 g of sodium cyanide at room temperature for 15 minutes in 175 ml of dimethyl sulphoxide. 52.7 g of the dye of the formula V

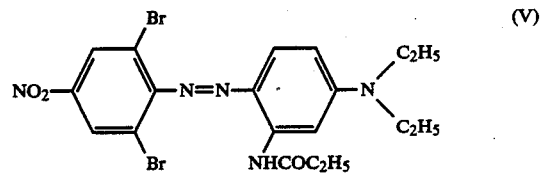

are then added, and the resulting mixture is heated to 110° to 115° C. and is stirred at this temperature for 1 hour. Stirring is continued until the mixture has cooled down, and the solids are filtered off with suction, washed with 25 ml of dimethyl sulphoxide, water, 5% strength aqueous ammonia and again with water, and dried under reduced pressure. This gives the dyestuff of the formula VI, which gives a blue solution in o-dichlorobenzene.

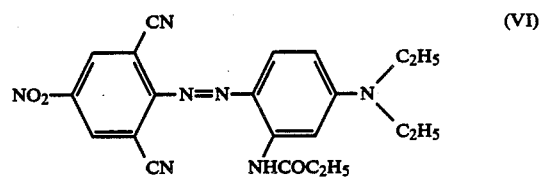

(b) Part (a) is repeated, except that 51.3 g of the dyestuff of the formula VII

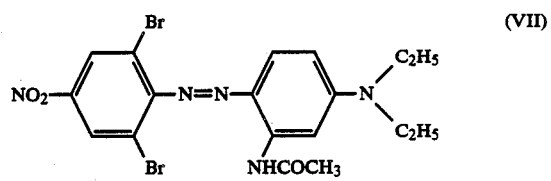

are used in place of the 52.7 g of the dyestuff of the formula V, affording the dyestuff of the formula VIII

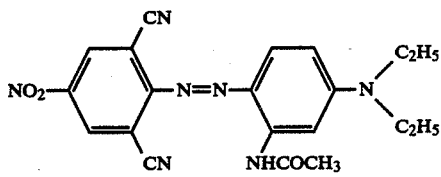

(VIII)

(c) 15.75 g each of the dyestuffs of the formulae VI and VIII prepared above in Examples 1a and 1b are adjusted together in 243.7 g of water containing 43.6 g of sodium ligninsulphonate and 12.6 g of a nonionic dispersant based on the aryl polyglycol ether (4-[(4'-benzyl)-phenyl]phenol+15 mol of ethylene oxide) with 50% strength acetic acid to pH 5.9 and are homogenised by means of a toothed stirrer. The resulting dispersion is then heated in the course of 3 hours in an autoclave to 120° C. and is stirred at this temperature for 2 hours. On cooling down, 43.6 g of a condensation product of cresol, formaldehyde and sodium naphthol-2-sulphonate are added, and the dispersion is brought to pH 8.0 with 50% strength acetic acid. It is then bead-milled at room temperature for 2 hours until 80% of the particles are $\leq 1\mu$ is sieved and is sprayed in a spray-dryer. The dyestuff powder thus obtained is used for dyeing in a manner described below under (d).

(d) 2.34 g of the dyestuff obtained in Example 1c are dispersed in 2,000 g of water. The dispersion is admixed with 4 g of ammonium sulphate, 2 g of a commercially available dispersant based on a condensation product of sodium naphthalenesulphonate and formaldehyde and 2 g of a condensation product of m-cresol, formaldehyde and sodium sulphite and is brought to pH 5.5. with acetic acid. 100 g of a texturised polyester fabric based on polyethylene glycol terephthalate are entered into the dyeing liquor thus obtained and are dyed therein at 125° C. for 1 hour. Subsequent rinsing, reduction clearing with a 0.2% strength sodium dithionite solution at 70° to 80° C. for 15 minutes, rinsing and drying gives a strong blue dyeing having excellent colouristic properties.

If, to test the degree of exhaustion, a further 100 g of a texturised polyester fabric based on polyethylene glycol terephthalate are entered into the dyebath and are dyed at 135° C. for 1 hour and are aftertreated like the actual dyeing, this gives a virtually colourless dyeing.

(e) X-ray counting tube diagrams are recorded of the single dyestuffs prepared in Examples 1a and 1b and of the mixed crystals prepared in Example 1c in a Siemens 11 x-ray counting tube diffractometer by means of $Cu_\alpha$ radiation. The resulting glancing angles of $2\theta$ with relative intensities $\geq 10\%$, relative to the highest peak in each case, the intensity of which was put equal to 100%, are given below in degree of angle (with the relative intensities in brackets):

(ea) Dyestuff VI of Example 1a:
$2\theta=5.77°$ (17.0%); 7.38° (100%); 8.0° (83.4%); 8.30° (28.8%); 9.92° (62.1%); 12.63° (13.6%); 13.27° (49.0%); 14.88° (17.7%); 18.56° (11.6%); 20.20° (11.2%); 21.43° (11.6%); 23.91° (15.7%); 26.06° (55.7%); 27.20° (34.4%); 27.96° (14.6%).

(eb) Dyestuff VIII of Example 1b:
$2\theta=6.86°$ (47.4%); 9.92° (100%); 12.34° (11.8%); 13.77° (39.6%); 14.66° (12.9%); 17.37° (14.6%); 20.13° (26.9%); 21.49° (16.2%); 21.83° (11.7%); 22.54° (18.2%); 23.76° (14.0%); 24.88° (42.7%); 26.71° (78.6%); 28.91° (29.2%).

(ec) Dyestuff (a mixed crystal of the dyestuffs VI and VIII in a weight ratio of 1:1) of Example 1c:
$2\theta=7.61°$ (100%); 10.13° (60.4%); 13.62° (60.1%); 18.81° (10.4%); 20.40° (13.3%); 24.16° (19.1%); 26.41° (34.1%); 27.48° (11.0%).

EXAMPLE 2

(a) Example 1a is repeated, except that 54.1 g of the dyestuff of the formula IX

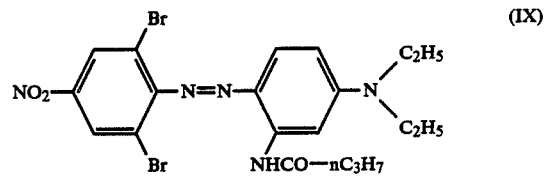

(IX)

are used in place of the 52.7 g of the dyestuff of the formula V, affording the dyestuff of the formula X

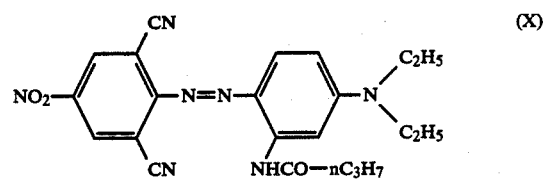

(X)

(b) 10.5 g of the formula VIII dyestuff prepared in Example 1b and 21.0 g of the formula X dyestuff prepared in Example 2a are jointly heated under pressure and converted into a dyestuff powder, the procedure used being as described in Example 1c.

(c) 2.34 g of the dyestuff powder obtained in Example 2b is used in the manner of Example 1d to prepare a dyeing liquor, in which 100 g of a texturised polyester fabric are then dyed at 115° C. for 1 hour. The fabric is finished as in Example 1d to give an intense blue dyeing having excellent colouristic properties.

The fabric dyed subsequently in the manner of Example 1d at 135° C. in the residual bath, to test the degree of exhaustion, is only slightly stained.

(d) The X-ray counting tube diagrams prepared as in Example (1e) produce the following values:
Dyestuff X of Example 2a:
$2\theta=7.47°$ (89.7%); 9.90° (100%); 10.89° (11.5%); 12.98° (16.4%); 13.54° (48%); 15.06° (21.2%); 19.48° (14.3%); 21.81° (10.5%); 23.34° (18.9%); 23.5° (21.6%); 24.42° (13.3%); 24.62° (17.9%); 24.78° (19%); 25.04° (16.4%); 25.59° (24.3%); 25.81° (28.3%); 25.99° (24.6%); 26.40° (24.2%); 26.79° (24.3%); 27.01° (19.5%).

Dyestuff (mixed crystals of the dyestuffs VIII and X in a weight ratio of 1:2) of Example 2b:
$2\theta=7.44°$ (100%); 9.90° (66.9%); 13.44° (39.2%); 15.02° (11%); 23.79° (17.1%); 26.24° (48.7%); 27.2° (16.6%).

(e) 41.8 g of sodium cyanide and 140.4 g of copper(I) cyanide are added in succession with continuous stirring at 70° to 75° C. to 1,000 ml of dimethyl sulphoxide. After the addition is complete, the mixture is stirred at 70° to 75° C. for a further ½ hour. A mixture of 360.7 g of the dyestuff of the formula IX with 171.0 g of the dyestuff of the formula VII is then added with stirring at this temperature, and the batch is then heated to a temperature of 110° to 112° C. and is held at this temperature for 1 hour. The batch is then allowed to cool down slowly to room temperature as the continuous stirring is continued, and the precipitated dyestuff is filtered off with suction. The dyestuff filtered off with suction is washed with 240 ml of dimethyl sulphoxide and 7.5% strength aqueous ammonia until the liquor running off is colourless. The dyestuff is then washed with water until neutral and is dried in a water jet vacuum. The mixed crystal dyestuff obtained has the same x-ray counting tube diagram as the dyestuff contained in Example 2b.

31.5 g of the dyestuff thus prepared as homogenised in 243.7 g of water containing 43.6 g of sodium ligninsulphonate and 12.6 g of a nonionic dispersant based on an aryl polyglycol ether, namely (4-[(4'-benzyl)phenyl]-phenol+15ethylene oxide), and containing 43.6 g of a condensation product of cresol, formaldehyde and sodium naphthol-2-sulphonate, by means of a toothed stirrer, and the dispersion is brought to pH 8.0 by means of 50% strength acetic acid. The dispersion is then bead-milled at room temperature for 2 hours until 80% of the particles are $\approx 1$ $\mu$m, is seived and is sprayed in a spray-dryer. The dyestuff powder thus obtained is used for dyeing in a manner described in Example 1d, the dyeing temperature, however, being 115° C., and produces an equally intensive blue dyeing yield having the same excellent colouristic properties as in Example 2c.

(f) Dyeing with carrier at the boil:
  0.2 g of the 24% strength dyestuff powder prepared in Example 2e is stirred into 250 ml of water and is admixed, with stirring, with 0.4 g of a commercially available dispersant based on a condensation product of m-cresol, formaldehyde and sodium sulphite, 0.8 g of a commercially available carrier based on methylnaphthalene, 0.8 g of crystalline sodium acetate and 1.2 ml of 30% strength acetic acid, and the mixture is made up to 400 ml with water. The pH of the dyebath is 4.5. 10 g of a polyester fabric based on polyethylene glycol terephthalate are entered into this dyebath. The dyeing is carried out at 95° C. in an open vessel in the course of 90 minutes, and the dyed material is removed, rinsed, reduction-cleared with an alkaline 0.2% strength sodium dithionite solution (15 minutes at 60° to 70° C.), rinsed again, and dried.

(g) 0.15 g of the 24% strength dyestuff powder prepared in Example 2e is introduced into 200 ml of water and is admixed, with stirring, with 0.2 g of a commercially available dispersant based on a condensation product of m-cresol, formaldehyde and sodium sulphite, 0.3 g of a commercially available carrier based on methylnaphthalene, 0.4 g of crystalline sodium acetate and 1.2 ml of 30% strength acetic acid. The pH of the dyebath is 4.5. 10 g of a polyester fabric based on polyethylene glycol terephthalate are entered into this dyebath and are dyed in a dyeing autoclave under pressure at 106° C. in the course of 1 hour. The dyed fabric is then finished as described above, namely by rinsing, reduction-clearing, renewed rinsing and drying.

Intense blue dyeings are obtained in both cases.

EXAMPLE 3

Example 1a is repeated, except that a mixture of 26.35 g of the dyestuff V and 25.65 g of the dyestuff VII is used in place of the 52.7 g of the dyestuff V, affording a dyestuff which has an X-ray counting tube diagram which is identical to the X-ray counting tube diagram given in Example 1ec.

EXAMPLE 4

30 g of the dyestuff of the formula VIII and 30 g of the dyestuff of the formula VI are dissolved in 400 ml of hot dimethyl sulphoxide, and the solution is filtered. As the filtrate cools down mixed crystals precipitate and are then filtered off with suction, washed with water and dried at 50° C. under reduced pressure. The mixed crystals have the same X-ray counting tube diagram as in Example 1ec.

EXAMPLE 5

Example 1d is repeated, except that 1.17 g each of the dyestuffs of the formulae VIII and X, which have been separately pretreated in the manner of Example 1c, are used in place of the 2.34 g of the dyestuff obtained in Example 1b, affording, again, an intense blue dyeing and a virtually colourless exhaustion test.

It is likely that, in the course of this dyeing, mixed crystals from the two dyestuffs form in the dyebath.

EXAMPLE 6

Example 1d is repeated, except that 1.17 g of the commercial form of the dyestuff of the formula VIII and 1.17 g of the dyestuff of the formula X, which has been pretreated as in Example 1c without, however, having been heated under pressure, are used in place of the 2.34 g of the dyestuff obtained in Example 1b, affording, again, an intense blue dyeing and a virtually colourless exhaustion test.

The following table gives further dyestuff mixtures of the invention, together with the meanings of R, $R^1$ and $R^2$ and the weight ratio of the individual dyestuffs of the formula I, which dyestuff mixtures can be prepared by the above procedures and which likewise give on polyester materials intense blue dyeings and prints having likewise very good colouristic properties.

| Example | $R^1$ | $R^2$ | R | Weight ratio |
|---|---|---|---|---|
| 7 | $C_2H_5$ | $C_2H_5$ | $CH_3$ | 2 |
|   | $C_2H_5$ | $C_2H_5$ | $C_2H_5$ | 1 |
| 8 | $C_2H_5$ | $C_2H_5$ | $CH_3$ | 1 |
|   | $C_2H_5$ | $C_2H_5$ | $C_2H_5$ | 2 |
| 9 | $n-C_3H_7$ | $n-C_3H_7$ | $CH_3$ | 1 |
|   | $n-C_3H_7$ | $n-C_3H_7$ | $C_2H_5$ | 1 |
| 10 | $n-C_3H_7$ | $n-C_3H_7$ | $CH_3$ | 3 |
|   | $C_2H_5$ | $C_2H_5$ | $C_2H_5$ | 4 |
| 11 | $n-C_4H_9$ | $n-C_4H_9$ | $CH_3$ | 2 |
|   | $C_2H_5$ | $C_2H_5$ | $C_2H_5$ | 3 |
| 12 | $C_2H_5$ | $i-C_3H_7$ | $CH_3$ | 1 |
|   | $C_2H_5$ | $C_2H_5$ | $C_2H_5$ | 3 |
| 13 | $C_2H_5$ | $C_2H_5$ | $CH_3$ | 1 |
|   | $CH_3$ | $n-C_4H_9$ | $C_2CH_5$ | 1 |
| 14 | $n-C_3H_7$ | $n-C_3H_7$ | $CH_3$ | 2 |
|   | $C_2H_5$ | $C_2H_5$ | $C_2H_5$ | 1 |
| 15 | $C_2H_5$ | $C_2H_5$ | $CH_3$ | 1 |
|   | $C_2H_5$ | $C_2H_5$ | $n-C_3H_7$ | 1 |
| 16 | $C_2H_5$ | $C_2H_5$ | $CH_3$ | 1 |
|   | $C_2H_5$ | $C_2H_5$ | $n-C_3H_7$ | 3 |
| 17 | $n-C_3H_7$ | $n-C_3H_7$ | $CH_3$ | 1 |
|   | $C_2H_5$ | $C_2H_5$ | $n-C_3H_7$ | 1 |
| 18 | $n-C_3H_7$ | $n-C_3H_7$ | $CH_3$ | 5 |
|   | $n-C_3H_7$ | $n-C_3H_7$ | $n-C_3H_7$ | 4 |
| 19 | $n-C_4H_9$ | $n-C_4H_9$ | $CH_3$ | 3 |
|   | $C_2H_5$ | $C_2H_5$ | $n-C_3H_7$ | 4 |
| 20 | $CH_3$ | $i-C_4H_9$ | $CH_3$ | 1 |
|   | $C_2H_5$ | $C_2H_5$ | $n-C_3H_7$ | 3 |
| 21 | $C_2H_5$ | $C_2H_5$ | $CH_3$ | 1 |
|   | $C_2H_5$ | $i-C_3H_7$ | $n-C_3H_7$ | 1 |
| 22 | $C_2H_5$ | $C_2H_5$ | $CH_3$ | 5 |
|   | $C_2H_5$ | $C_2H_5$ | $i-C_3H_7$ | 7 |
| 23 | $n-C_3H_7$ | $n-C_3H_7$ | $CH_3$ | 1 |

-continued

| Example | R¹ | R² | R | Weight ratio |
|---|---|---|---|---|
|  | C₂H₅ | C₂H₅ | i-C₃H₇ | 1 |
| 24 | C₂H₅ | C₂H₅ | CH₃ | 3 |
|  | C₂H₅ | C₂H₅ | n-C₄H₉ | 7 |
| 25 | n-C₄H₉ | n-C₄H₉ | C₂H₅ | 2 |
|  | C₂H₅ | C₂H₅ | i-C₄H₉ | 1 |
| 26 | C₂H₅ | C₂H₅ | n-C₃H₇ | 1 |
|  | C₂H₅ | C₂H₅ | sec.-C₄H₉ | 1 |
| 27 | n-C₃H₅ | n-C₃H₇ | CH₃ | 1 |
|  | C₂H₅ | C₂H₅ | n-C₅H₁₁ | 2 |
| 28 | C₂H₅ | i-C₃H₇ | C₂H₅ | 1 |
|  | C₂H₅ | i-C₃H₇ | CH(CH₃)—C₃H₇ | 1 |
| 29 | C₂H₅ | C₂H₅ | C₂H₅ | 1 |
|  | CH₃ | CH₃ | CH(C₂H₅)₂ | 1 |
| 30 | C₂H₅ | C₂H₅ | CH₃ | 1 |
|  | C₂H₅ | C₂H₅ | C₂H₅ | 1 |
|  | C₂H₅ | C₂H₅ | n-C₃H₇ | 1 |
| 31 | C₂H₅ | C₂H₅ | CH₃ | 3 |
|  | C₂H₅ | C₂H₅ | C₂H₅ | 1 |
|  | C₂H₅ | C₂H₅ | n-C₃H₇ | 1 |
| 32 | n-C₃H₇ | n-C₃H₇ | CH₃ | 1 |
|  | C₂H₅ | C₂H₅ | C₂H₅ | 1 |
|  | C₂H₅ | C₂H₅ | n-C₃H₇ | 1 |
| 33 | C₂H₅ | C₂H₅ | C₂H₅ | 1 |
|  | C₂H₅ | C₂H₅ | n-C₃H₇ | 2 |
|  | C₂H₅ | C₂H₅ | i-C₃H₇ | 2 |
| 34 | C₂H | C₂H₅ | CH₃ | 1 |
|  | C₂H₅ | C₂H₅ | C₂H₅ | 1 |
|  | C₂H₅ | C₂H₅ | n-C₃H₇ | 1 |
|  | C₂H₅ | C₂H₅ | i-C₃H₇ | 1 |
| 35 | C₂H₅ | C₂H₅ | C₂H₅ | 1 |
|  | C₂H₅ | C₂H₅ | n-C₃H₇ | 1 |
| 36 | n-C₃H₇ | n-C₃H₇ | C₂H₅ | 1 |
|  | C₂H₅ | C₂H₅ | n-C₃H₇ | 2 |
| 37 | C₂H₅ | C₂H₅ | C₂H₅ | 1 |
|  | n-C₃H₇ | n-C₃H₇ | i-C₃H₇ | 1 |
| 38 | C₂H₅ | C₂H₅ | C₂H₅ | 2 |
|  | i-C₃H₇ | C₂H₅ | i-C₃H₇ | 1 |
| 39 | C₂H₅ | C₂H₅ | n-C₃H₇ | 1 |

-continued

| Example | R¹ | R² | R | Weight ratio |
|---|---|---|---|---|
|  | C₂H₅ | C₂H₅ | i-C₃H₇ | 1 |
| 40 | C₂H₅ | C₂H₅ | n-C₃H₇ | 2 |
|  | C₂H₅ | C₂H₅ | i-C₃H₇ | 1 |
| 41 | n-C₃H₇ | n-C₃H₇ | n-C₃H₇ | 1 |
|  | C₂H₅ | C₂H₅ | i-C₃H₇ | 1 |

What is claimed is:

1. In the process for dyeing and printing hydrophobic fiber material with a mixture of mono azo dyestuffs, wherein said mono azo dyestuff mixture comprises the dye of the formula

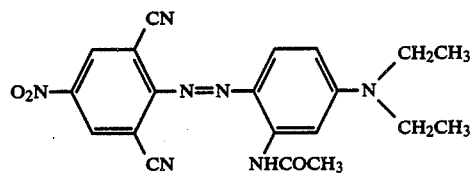

and the dye of the formula

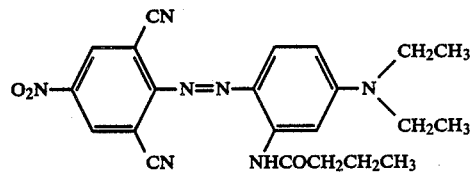

in a weight ratio of 10:90 to 90:10.

2. A process according to claim 1 wherein said weight ratio is from 70:30 to 30:70.

3. A process according to claim 1 wherein said weight ratio is 50:50.

* * * * *